United States Patent [19]

Walker

[11] Patent Number: 4,959,920
[45] Date of Patent: Oct. 2, 1990

[54] MULTI-ACTION FISHING LURE

[76] Inventor: Wendall C. Walker, 1525 E. 2nd St., Apt. 1111, Granbury, Tex. 76048

[21] Appl. No.: 334,592

[22] Filed: Apr. 6, 1989

[51] Int. Cl.$^5$ ............................................. A01K 85/00
[52] U.S. Cl. .................................. 43/42.47; 43/42.15; 43/42.39
[58] Field of Search ................. 43/42.15, 42.39, 42.47, 43/42.18, 42.22

[56] References Cited

U.S. PATENT DOCUMENTS

| | | | |
|---|---|---|---|
| D. 147,901 | 11/1947 | Findlay | D31/4 |
| 661,869 | 11/1900 | Henkenius . | |
| 956,872 | 5/1910 | Alger | 43/42.39 |
| 1,133,669 | 3/1915 | Reynolds | 43/42.47 |
| 1,155,883 | 10/1915 | Burkman . | |
| 1,474,823 | 11/1923 | Hines . | |
| 1,581,833 | 4/1926 | Bonnett | 43/42.15 |
| 1,607,107 | 11/1926 | Weller . | |
| 1,694,195 | 12/1928 | Watts . | |
| 1,832,172 | 11/1931 | Winter . | |
| 2,079,335 | 5/1937 | Pflueger | 43/47 |
| 2,207,425 | 7/1940 | Arbogast | 43/42.47 |
| 2,295,765 | 9/1942 | Weber | 43/48 |
| 2,360,563 | 10/1944 | Harman | 43/46 |
| 2,448,523 | 9/1948 | Fibiger | 43/43 |
| 2,494,407 | 1/1950 | Rhodes | 43/42.05 |
| 2,496,231 | 1/1950 | Phippen | 43/42.47 |
| 2,545,398 | 3/1951 | Waroblew | 43/42.16 |
| 2,835,068 | 5/1958 | Latham | 43/42.16 |
| 2,878,611 | 3/1959 | Netherton et al. | 43/42.06 |
| 2,878,612 | 3/1959 | Netherton et al. | 43/42.31 |
| 3,367,059 | 2/1968 | Puls et al. | 43/42.14 |
| 3,757,454 | 9/1973 | Shurley | 43/42.16 |
| 3,815,275 | 6/1974 | Amundson | 43/42.22 |
| 4,445,294 | 5/1984 | Gowing | 43/42.47 |
| 4,567,685 | 2/1986 | Duncan | 43/42.15 |
| 4,573,282 | 3/1986 | Rowe | 43/42.15 |
| 4,739,576 | 4/1988 | Davis | 43/42.47 |

FOREIGN PATENT DOCUMENTS

| | | | |
|---|---|---|---|
| 909599 | 3/1945 | France | 43/42.15 |

Primary Examiner—Kurt Rowan
Attorney, Agent, or Firm—Hubbard, Thurman, Turner, Tucker & Harris

[57] ABSTRACT

A multi-action fishing lure has a buoyant, relatively short head section to which an elongated buoyant tail section is jointedly secured, the tail section having a pair of depending treble hooks operatively secured thereto in a longitudinally spaced relationship. The front end of the head section has a concave face to which a line eye is secured in a downwardly off-centered orientation. Secured to a bottom front portion of the head section is an elongated, essentially planar lip member which is downwardly and forwardly angled relative to the head section, laterally protrudes downwardly and forwardly of the front end of the head section, and longitudinally protrudes horizontally from opposite sides of the head section. When the lure floats in an at-rest position on the water's surface, the head section is downwardly and rearwardly canted by a small weight structure positioned within a lower rear end portion of the head section. By appropriately altering line pull or retrieve, the lure can be given four distinct fish attracting actions—a surface popping action, a surface twitching or "walking" action, a subsurface diving/wiggling action, or a surface water "pluming" action in which the lure is caused to roll over on its back during steady line retrieval and then roll back over to its normal at-rest water surface position when the line is slackened.

18 Claims, 2 Drawing Sheets 4,959,920

MULTI-ACTION FISHING LURE

BACKGROUND OF THE INVENTION

The present invention relates generally to artificial fishing lures and, in a preferred embodiment thereof, more particularly provides a multi-action fishing lure to which at least four distinct fish-attracting actions may be easily imparted without modifying or replacing any of its components.

Artificial fishing lures are available in a wide variety of shapes, sizes and lure "actions" for inducing gamefish to strike and be hooked by the lures. Such lure actions representatively include a surface popping action designed to create a relatively loud surface disturbance when the fishing line attached to the floating lure is forwardly jerked relative to the lure; a diving/wiggling action in which the lure travels under water with a "wobbling" action as the line is steadily retrieved; a surface "walking" action generated by alternately horizontally angled line twitches; and a flashing action created by one or more shiny spinner blades rotationally secured to the lure body.

Most artificial lures are designed to provide only one of the above-mentioned or other single lure actions when retrieved by the fisherman. If a different fish-attracting lure action is desired, it is usually necessary for the fisherman to tie a lure of a different type onto the end of his line.

In an attempt to build more action variety into artificial fishing lures, various proposals have been made to provide a particular lure with adjustable or interchangeable parts which alter its action when retrieved. While adding to the operational flexibility of the lure, this approach does not permit the lure action to be varied while the lure is in the water—it must be reeled in, altered, and then cast back out. Additionally, the required lure part replacement or adjustment can be a fairly time-consuming and tedious task, often taking more time than that required to simply tie on a different lure.

Another method proposed for altering the action of a fishing lure is to provide a line attachment structure having more than one aperture therein to which the fishing line may be secured, each aperture imparting a different water attack attitude to the lure as it is retrieved. Like the lure part adjustment or replacement method mentioned above, this method also does not permit the lure action to be appreciably varied while the lure is in the water, and takes the same time as that required to simply tie a different lure on the fisherman's line.

From the foregoing it can be seen that it would be desirable to provide a fishing lure to which a fisherman could impart a variety of different fish-attracting actions, while the lure is in the water, without the previous necessity of retrieving the lure and adjusting or replacing one or more of its components, or retying the line thereto. It is accordingly an object of the present invention to provide such a lure.

SUMMARY OF THE INVENTION

Figure 1:
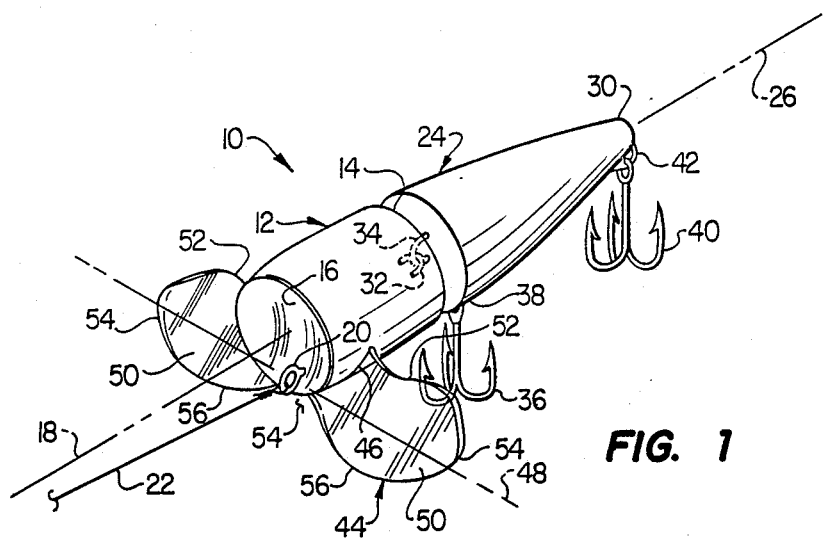
FIG. 1 is a perspective view of a floating/diving multiaction fishing lure embodying principles of the present invention.
Figures 2, 3:
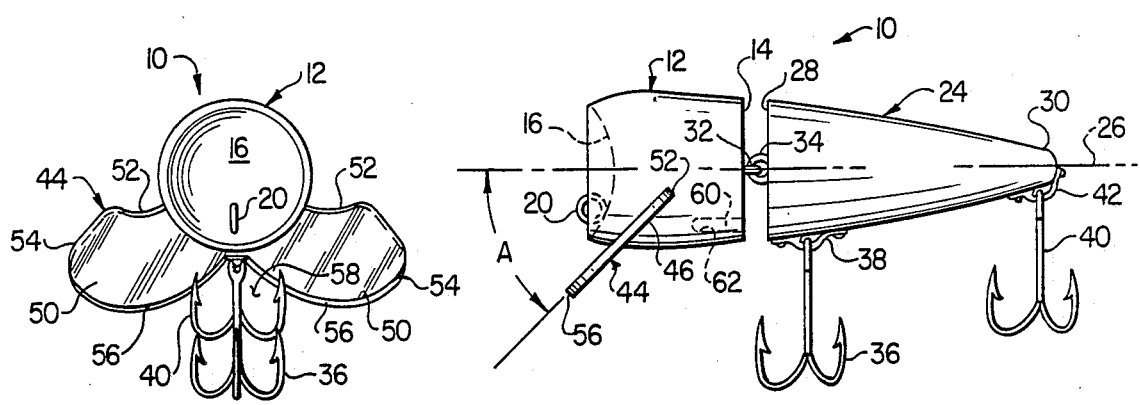
FIG. 2 is a front end elevational view of the lure.
FIG. 3 is a left side elevational view of the lure.
Figure 4:
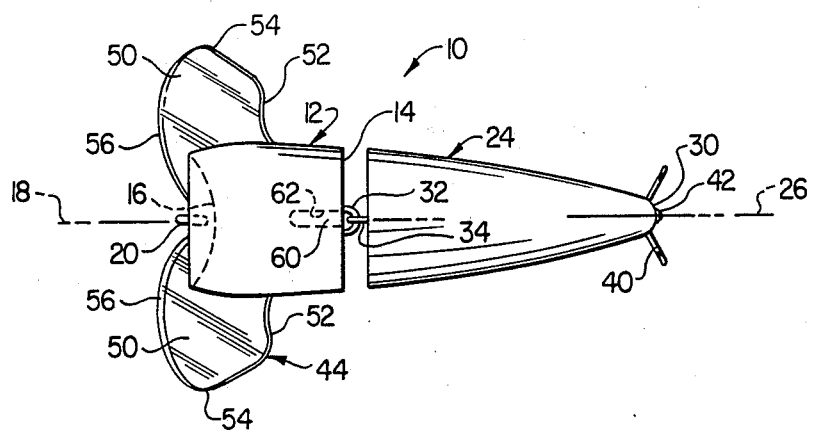
FIG. 4 is a top plan view of the lure.

In carrying out principles of the present invention, in accordance with a preferred embodiment thereof, a floating/diving multi-action fishing lure is provided which may have at least four different fish-attracting actions imparted thereto by the fisherman without altering or replacing any of the lure's components or repositioning the line connection location thereon.

The lure comprises jointly connected buoyant head and tail sections, the tail section being preferably about twice as long as the head section. The head section extends forwardly and rearwardly along a central axis and has a concavely dished front end to which a line connection eye member is secured in a downwardly offset relationship with such axis. Two treble hooks are secured to the underside of the tail section in a spaced relationship along its length. A lower rear end portion of the head section is weighted in a manner such that with the lure in its floating "at-rest" position on the water the head section is rearwardly and downwardly tilted.

A central portion of an elongated, essentially planar rigid lip member is suitably anchored within a rearwardly and upwardly sloped slot formed in the underside of the head section adjacent its front end. The lip member is positioned beneath the head section axis, and the plane of the lip member is downwardly and forwardly sloped relative to the central head section axis at an angle within the range of from about 37° to about 60°, and preferably about 45°. Opposite end portions of the lip member project transversely and horizontally outwardly from opposite sides of the head section and have essentially straight rear side edges, curved outer ends, and curved front side edges which are positioned forwardly and downwardly of the front end of the head section. A central water relief indentation is formed in a front edge portion of the lip member between its oppositely projecting end portions.

With the lure end of a fishing line secured to the line eye, and the lure floating on the water's surface in its at-rest position, the fisherman can impart at least four separate and distinct fish-attracting actions to the lure due to the unique cooperation among the downwardly offset line eye, the weight means in the head section, and the specially configured and oriented lip member. Such actions include:

1. A surface "popping" action;
2. A surface "twitching" or "walking" action;
3. A subsurface "diving/wiggling" action; and
4. A surface "pluming" action in which the lure, in an upside down orientation, is pulled across the water to create a front end water plume, and then rolls over to its normal upright position, simulating an injured baitfish "death roll" when the line is slackened.

From an at-rest position on the water's surface, the surface popping action of the lure is achieved simply by sharply twitching or tugging the line in a forward direction relative to the head section of the lure. This causes the concave lure head to make a distinctive popping sound while creating a surface splash in front of it—this particular lure action being enhanced by both the downwardly offset line eye and the head section weight means which permit each "pop" to be initiated with the lure head section in a downwardly and rearwardly canted orientation. During this popping lure action mode, the lip member digs into the water at each pop of the lure to limit the forward lure travel during each pop. This advantageously permits the lure to be popped repeatedly near fish-holding cover, such as lily pads, submerged stumps, downed trees and the like, before the lure is moved too far away from the cover to be attractive to gamefish holding closely adjacent thereto.

The surface twitching or walking action is imparted to the lure by an oppositely alternating slightly horizontally angled twitching of the line which causes the lure, in addition to popping, to alternately flip from side-to-side on the water's surface between positions in which the length of the lure is at an angle to the fishing line.

To initiate the rolled-over surface pluming action of the lure, a hard, straight pull is exerted on the lure when it is cocked to one side relative to the line. This causes the lure to roll over on its back due to the angle of the lip member relative to the line when the hard line pull is initiated. After lure roll-over is achieved, a steady line retrieve is begun to drag the inverted lure across the water's surface, creating a water plume passing rearwardly over the now forwardly and upwardly sloped inverted lip member. After the lure has been retrieved a desired distance in this surface pluming mode, the line is slackened. When the line is slackened, the head section weight means cause the lure to roll over to its normal upright position on the water, thereby simulating an injured baitfish "death roll".

Finally, with the lure in its normal at-rest surface position its subsurface diving and side-to-side wiggling mode may be initiated simply by steadily retrieving the lure to cause it, due to the action of its lip member, to dive beneath the water's surface and wobble side-to-side in a manner simulating the swimming motion of a baitfish. A slackening of the line during this action mode allows the lure to float to the surface, thereby readying the lure for further retrieve in the same or another one of its available action modes.

DETAILED DESCRIPTION

As illustrated in FIGS. 1–4 of the drawings, the present invention provides a floating/diving multi-action artificial fishing lure 10 which, as subsequently described, may have at least four distinctly different fish-attracting actions imparted thereto by the fisherman while the lure is in the water, and without the necessity of replacing or adjusting any components of the lure or retying the fishing line thereto. The lure 10 includes a buoyant, generally cylindrical head section 12 having a substantially flat rear end 14 and a concavely dished front end 16, and extending along a central axis 18. A line attachment eye member 20, to which the lure end of a fishing line 22 may be tied, is suitably secured to the concave front end 16 at a location thereon laterally aligned with and downwardly offset from the axis 18.

The lure 10 also includes an elongated, buoyant tail section 24 which extends along a central longitudinal axis 26 and has a circular cross-section along its length, a generally flat front end 28, and a curved rear end 30. As illustrated, the tail section 24 is tapered rearwardly and laterally inwardly from its front end 28 to its rear end 30. The head and tail sections 12 and 24 are jointedly connected to one another by interconnected eye members 32 and 34 respectively anchored to the facing ends 14 and 28 of the head and tail sections 12 and 24. A treble hook 36 is swingingly secured to a front underside portion of the tail section 24 by means of a conventional hook hanger 38. In a similar manner, a treble hook 40 is swingingly secured to the underside of the tail section 24, adjacent its rear end 30, by means of a hook hanger 42. As illustrated, the tail section 24 is preferably approximately twice as long as the head section 12.

A central portion of an elongated, generally planar lip member 44 is suitably anchored within an upwardly and rearwardly sloped slot 46 formed in the underside of a front portion of the lure head section 12. The lip member 44, which is disposed beneath the head section axis 18, extends along a central longitudinal axis 48 which is transverse to the head section axis 18 and is aligned (in a front-to-rear sense relative to the head section 12) with the line attachment eye member 20 as best illustrated in FIG. 1.

The plane of the lip member 44 is downwardly and forwardly sloped relative to the head section axis 18 (FIG. 3) at an angle "A" which is preferably approximately 45°, but may alternately be within the range of from approximately 37° to approximately 60°. End portions 50 of the lip member 44, each of which defines a separate "vane" or "paddle" portion of the lip member, project laterally and horizontally outwardly from opposite sides of the head section 12 and have essentially straight rear side edges 52, curved outer ends 54, curved front side edges 56 which are positioned forwardly and downwardly of the front end of the head section 12, and a central water relief indentation 58 positioned between the inner ends of the front side edges 56.

The lip member 44 is conveniently formed from a high strength, transparent plastic material, but may be alternately formed from another suitably rigid material such as metal. For purposes later described, a small weight member 60 (FIGS. 3 and 4) is positioned within a small bore 62 formed inwardly through the rear end 14 of the head section 12 directly beneath and parallel to the head section axis 18.

Figures 5, 6:
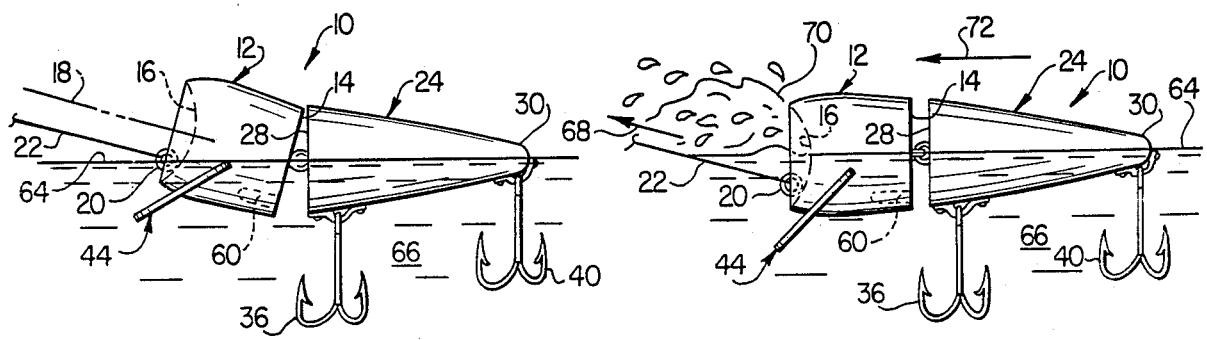
FIG. 5 is a left side elevational view of the lure in its floating, "at rest" position on the surface of the water.
FIG. 6 is a left side elevational view of the lure being used in a "surface popping" mode thereof.

With the lure end of the line 22 suitably knotted to the line attachment eye member 20, the lure 10 is cast out in the usual manner to land upon the surface 64 of the water 66, whereupon the lure 10 assumes its normal at-rest water surface position depicted in FIG. 5. With the lure in the this at-rest surface position, the weight member 60 causes the lure head section 12 to be downwardly and rearwardly canted relative to the water surface 64, with the lip member 44 positioned just beneath the water surface. As previously mentioned, the lure 10 may be given at least four separate and distinct fish-attracting actions without adjusting or replacing any of its components, and without the necessity of retying the line 22 to the lure. This unique ability to impart four different actions to the lure 10 arises primarily from the uniquely configured and positioned lip member 44, and is augmented by the downwardly offset eye member 20 and the weight member 60. As will now be described, these four distinct lure actions include:
1. A surface "popping" action;
2. A surface "twitching" or "walking" action;
3. A subsurface "diving/wiggling" action; and
4. A surface "pluming" action in which the lure, in an upside down orientation, is pulled across the water to create a front end water plume, and then rolls over to its normal upright position, thereby simulating an injured baitfish "death roll", when the line is slackened.

Referring now to FIG. 6, the surface popping action of the lure 10, from the at-rest surface position of the lure depicted in FIG. 5, is achieved simply by sharply twitching or tugging the line 22 in a forward direction relative to the lure head section as indicated by the arrow 68 in FIG. 6. This causes the concave front end 16 of the head section 12 to make a distinctive popping sound while creating a surface water splash 70 in front of the lure. This particular lure action is enhanced by both the downwardly offset line eye 20 and the head section weight means 60 which permit each "pop" to be initiated with the lure head section 12 in a downwardly and rearwardly canted orientation. During this popping lure action mode, the lip member 44 digs into the water 66 at each pop of the lure to pivot the head section 12 in a counterclockwise direction, as may be seen by comparing FIGS. 5 and 6, to augment the popping/splash action of the lure head.

This digging-in of the lip member occurring as the line 22 is forwardly twitched additionally functions to limit the forward lure travel, indicated by the arrow 72 in FIG. 6, during each pop. The forward motion-limiting reactive force of the lip member 44 is increased, compared for example to conventional diving lures provided with single lip structures positioned only under their front body ends, by virtue of its relatively large surface relative to the cross-sectional area of the head section 12. This advantageously permits the lure 10 to be popped repeatedly near fish-holding cover, such as lily pads, submerged stumps, downed trees, and the like, before the lure is moved too far away from the cover to be attractive to gamefish holding closely adjacent thereto.

Figure 7:
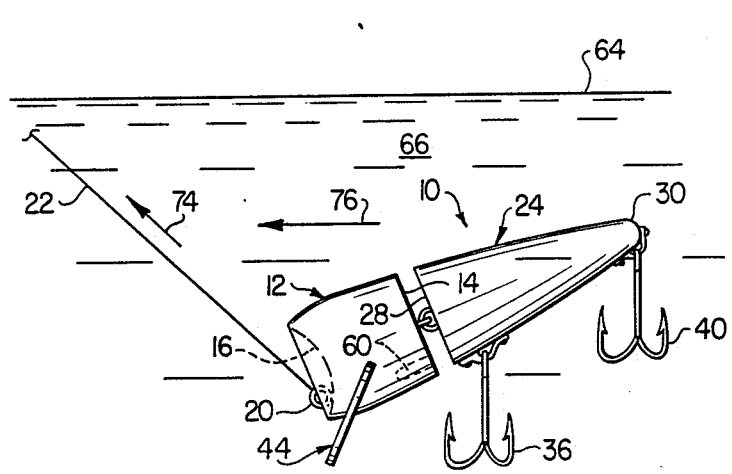
FIG. 7 is a left side elevational view of the lure being used in its "diving/wiggling" mode.
Figure 8:
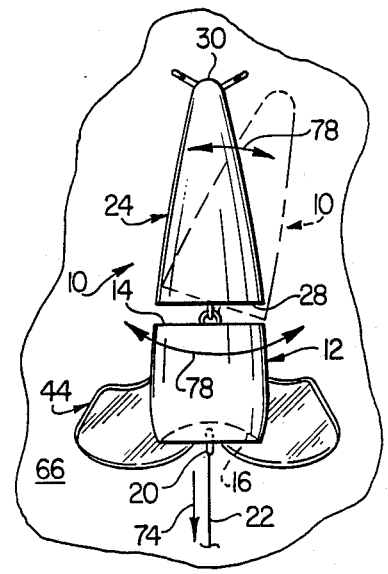
FIG. 8 is a top plan view of the lure as depicted in FIG. 7.

Referring now to FIGS. 7 and 8, the second distinct fish-attracting action which may be easily imparted to the lure 10 may be termed a subsurface "diving/wiggling" action. This diving/wiggling action may be imparted through the lure, from its at-rest water surface position depicted in FIG. 5, simply by steadily retrieving the line 22, as indicated by the arrows 74 in FIGS. 7 and 8. Such steady line retrieve, via the action of lip member 44, causes the lure 10 to dive beneath the water surface 64 and travel forwardly as indicated by the arrow 76 in FIG. 7 while wiggling side-to-side as indicated by the arrows 78 in FIG. 8. When the line 22 is slackened, the lure 10 floats back to the water surface 64 to once again assume its floating at-rest position. This diving/wiggling action is enhanced by the lip member water relief indentation 58 which functions to relieve rearward water pressure on a forward, longitudinally central portion of the lip member 44 which would otherwise tend to undesirably limit the available diving depth of the lure.

Figure 9:
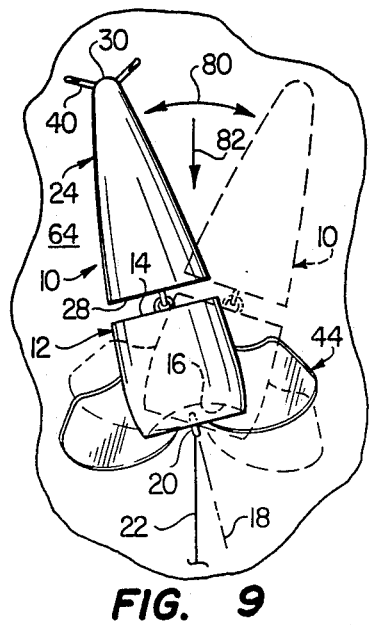
FIG. 9 is a top plan view of the lure being used in its surface "twitching" or "walking" mode.

The third action selectively impartable to the lure 10 is illustrated in FIG. 9 and may be termed a surface "twitching" or "walking" action. To initiate this surface twitching/walking action, the line 22 is given short tugs at alternating horizontal angles relative to the lure's head section axis 18. Due to the action of the lip member 44 in response to this horizontally angled line pull, the lure 10 is caused to flip from side-to-side on the water surface 64 between alternately canted angles relative to the line 22, as illustrated by the double-ended arrow 80 in FIG. 9, while moving forwardly a short distance as indicated by the arrow 82. In the same manner as when the lure is in its surface popping mode, the lip member 44 impedes the forward travel of the lure in its surface twitching/walking mode so that the lure 10 may be maintained, on each cast, closely adjacent fish-holding cover.

Figure 10:
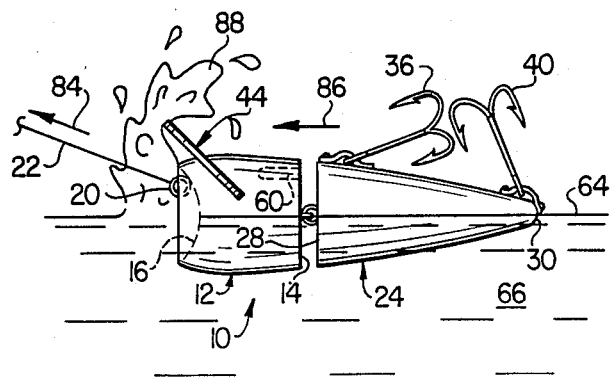
FIG. 10 is a side elevational view of the lure being used in its rolled-over "surface pluming" mode.

The fourth fish-attracting action which may be easily imparted to the lure 10 is illustrated in FIG. 10 and may be termed a rolled-over surface "pluming" action. To initiate this action, a hard forward pull 84 is made on the line 22 when the lure 10 is in one of its horizontally canted surface positions depicted in FIG. 9. The hard line pull, and an ensuing steady line retrieve, causes the lip member 44 to dig into the water in a manner causing the lure 10 to roll over on its back and be pulled forwardly along the water surface 64, as indicated by the arrow 86 in FIG. 10. During forward surface travel of the inverted lure 10 in this manner, the concave front end 16 of the head section 12 creates a surface water plume 88 which passes rearwardly over the inverted lip member 44, as illustrated, and creates a fish-attracting "gurgling" noise. After the inverted lure has been forwardly retrieved a desired distance, the line 22 is slackened. At this point, the weight means 60 in the lure head section 12 causes the entire lure to roll over to its surface at-rest position depicted in FIG. 5, thereby simulating a surface "death roll" of an injured baitfish.

It can be readily seen that any desired combination of these four distinct lure actions may be used in a variety of selected sequences during a single retrieve of the lure 10. This, of course, readily permits the fisherman to "experiment" with the lure to find just the right action, or combination of actions, which will entice fish to strike on a particular day. Importantly, as previously mentioned, this action flexibility of the lure is achieved without any necessity of adjusting or replacing any of its components, or altering the position thereon to which the fishing line is secured. It will readily be appreciated by fishermen that the lure 10 potentially provides a considerable lure cost savings since it, in effect, takes the place of four different fishing lures, each having but one of the four distinct lure actions described above.

The lure 10 may be easily and relatively inexpensively fabricated from readily available lure making materials. For example, the head and tail sections 12 and 24 may be formed from any suitable buoyant material, such as wood or hollow plastic. The illustrated treble hooks, the hook hangers, the line attachment eye, and the eyes which jointedly interconnect the head and tail sections of the lure are standard fishing lure hardware. The lip member 44, while being of a specially designed configuration, may be easily formed from a suitably rigid strip of plastic or metal. The illustrated weight means 60 may simply be lead or a few shotgun pellets suitably secured within the bore 62.

The foregoing detailed description is to be clearly understood as being given by way of illustration and example only, the spirit and scope of the present invention being limited solely by the appended claims.

What is claimed is:

1. A floating/diving multi-action fishing lure having an at-rest water surface position and comprising:
   a buoyant head section extending along an axis and having a rear end and a front end portion spaced apart from said rear end along said axis, said front end portion having a concavely dished front end surface;
   a buoyant tail section having front and rear ends spaced apart along an axis, said front end of said tail section being jointedly secured to said rear end of said head section in a spaced relationship therewith;
   at least one hook member operatively secured to one of said head and tail sections;
   a line attachment eye member operatively secured to said front end portion of said head section and connectable to the lure end of a fishing line; and
   elongated, generally planar lip means transversely secured to a front underside portion of said head section, the plane of said lip means being forwardly and downwardly sloped relative to said head section axis, said lip means laterally protruding forwardly and downwardly beyond said front end portion of said head section, and longitudinally projecting generally horizontally outwardly from opposite side portions of said head section, said lip means being selectively operative to:
   cooperate with said concavely dished front end surface of said head section to create a surface water pop forwardly thereof in response to a forward line tug exerted on said line attachment member with said lure in its at-rest water surface position, and diminish the forward surface travel of said lure created by the forward line tug, or
   cause said lure to twitch side-to-side on the water surface in response to a series of generally forward, sequentially oppositely horizontally angled line tugs exerted on said line attachment eye member with said lure in its at-rest water surface position, and diminish the forward surface travel of said lure created by the oppositely angled line tugs, or
   cause said lure to dive beneath the surface of the water and travel in a forward, side-to-side wiggling motion in response to a continuing line retrieval force exerted on said line attachment eye member and initiated when said lure is in its at-rest water surface position,
   said lip means being further operative, in response to a relatively hard, horizontally angled line pull on said line attachment eye member and an ensuing continuous line retrieval force thereon, to cause said lure to roll over from its at-rest water surface position onto its upper side, to an inverted lure position, and move forwardly along the water surface creating a water plume passing rearwardly over the inverted lip means
   said lure further comprising weight means, carried by said head section, for causing said lure to roll back over from said inverted lure position to its at-rest water surface position in response to termination of line force on said line attachment eye member,
   cooperate with said concavely dished front end surface of said head section to create a surface water pop forwardly thereof in response to a forward line tug exerted on said line attachment member with said lure in its at-rest water surface position, and diminish the forward surface travel of said lure created by the forward line tug, or
   cause said lure to twitch side-to-side on the water surface in response to a series of generally forward, sequentially oppositely horizontally angled line tugs exerted on said line attachment eye member with said lure in its at-rest water surface position, and diminish the forward surface travel of said lure created by the oppositely angled line tugs, or
   cause said lure to dive beneath the surface of the water and travel in a forward, side-to-side wiggling motion in response to a continuing line retrieval force exerted on said line attachment eye member and initiated when said lure is in its at-rest water surface position,
   said lip means being further operative, in response to a relatively hard, horizontally angled line pull on said line attachment eye member and an ensuing continuous line retrieval force thereon, to cause said lure to roll over from its at-rest water surface position onto its upper side, to an inverted lure position, and move forwardly along the water surface creating a water plume passing rearwardly over the inverted lip means
   said lure further comprising weight means, carried by said head section, for causing said lure to roll back over from said inverted lure position to its at-rest water surface position in response to termination of line force on said line attachment eye member.

2. A floating/diving multi-action fishing lure having an at-rest water surface position and comprising:
   a buoyant head section extending along an axis and having a rear end and a front end portion spaced apart from said rear end along said axis, said front end portion having a concavely dished front end surface;
   a buoyant tail section having front and rear ends spaced apart along an axis, said front end of said tail section being jointedly secured to said rear end of said head section in a spaced relationship therewith;
   at least one hook member operatively secured to one of said head and tail sections;
   a line attachment eye member operatively secured to said front end portion of said head section and connectable to the lure end of a fishing line; and
   elongated, generally planar lip means transversely secured to a front underside portion of said head section, the plane of said lip means being forwardly and downwardly sloped relative to said head section axis, said lip means laterally protruding forwardly and downwardly beyond said front end portion of said head section, and longitudinally projecting generally horizontally outwardly from opposite side portions of said head section, said lip means being selectively operative to:
   cooperate with said concavely dished front end surface of said head section to create a surface water pop forwardly thereof in response to a forward line tug exerted on said line attachment member with said lure in its at-rest water surface position, and diminish the forward surface travel of said lure created by the forward line tug, or
   cause said lure to twitch side-to-side on the water surface in response to a series of generally forward, sequentially oppositely horizontally angled line tugs exerted on said line attachment eye member with said lure in its at-rest water surface position, and diminish the forward surface travel of said lure created by the oppositely angled line tugs, or cause said lure to dive beneath the surface of the water and travel in a forward, side-to-side wiggling motion in response to a continuing line retrieval force exerted on said line attachment eye member and initiated when said lure is in its at-rest water surface position, said lure further comprising weight means carried by said head section for downwardly and rearwardly canting said head section when said lure is in its at-rest water surface position.

3. A floating/diving multi-action fishing lure having an at-rest water surface position and comprising:
a buoyant head section extending along an axis and having a rear end and a concavely dished front end spaced apart from said rear end along said axis;
a buoyant tail section having front and rear ends spaced apart along an axis, said front end of said tail section being jointedly secured to said rear end of said head section in a spaced relationship therewith;
at least one hook member operatively secured to one of said head and tail section;
a line attachment eye member operatively secured to said front end of said head section and connectable to the lure end of a fishing line;
lip means secured to a front underside portion of said head section, protruding forwardly and downwardly beyond said front end of said head section, and projecting generally horizontally outwardly from opposite side portions of said head section, said lip means being selectively operative to:
cooperate with said concavely dished front end of said head section to create a surface water pop forwardly thereof in response to a forward line tug exerted on said line attachment member with said lure in its at-rest water surface position, and diminish the forward surface travel of said lure created by the forward line tug, or
cause said lure to twitch side-to-side on the water surface in response to a series of generally forward, sequentially oppositely horizontally angled line tugs exerted on said line attachment eye member with said lure in its at-rest water surface position, and diminish the forward surface travel of said lure created by the oppositely angled line tugs, or
cause said lure to dive beneath the surface of the water and travel in a forward, side-to-side wiggling motion in response to a continuing line retrieval force exerted on said line attachment eye member and initiated when said lure is in its at-rest water surface position; and
weight means carried by said head section for downwardly and rearwardly canting said head section when said lure is in its at-rest water surface position,
said weight means being internally positioned within a lower rear end portion of said head section.

4. A floating/diving fishing lure comprising:
a buoyant head section extending along an axis and having a rear end and a front end portion spaced apart from said rear end along said axis, said front end portion having a generally circular, concavely dished front end surface;
a buoyant tail section having front and rear ends spaced apart along an axis, said front end of said tail section being jointedly secured to said rear end of said head section in a spaced relationship therewith;
at least one hook member operatively secured to said front end portion of said head section and connectable to the lure end of a fishing line; and
an elongated, generally planar rigid lip member transversely secured to the underside of said head section rearwardly of said front end surface thereof, said lip member being laterally canted forwardly and downwardly relative to said head section, having a front side edge portion spaced forwardly and downwardly apart from said front end surface, and having opposite end portions projecting horizontally outwardly from opposite sides of said head section,
said fishing lure having an at-rest water surface position and further comprising weight means associated with said head section for downwardly and rearwardly tilting said head section when said lure is in its at-rest water surface position.

5. The fishing lure of claim 4 wherein:
said line attachment eye member projects outwardly from a lower section of said front end surface of said head section.

6. The multi-action fishing lure of claim 4 wherein:
said line attachment eye member is downwardly offset from and generally laterally aligned with said head section axis.

7. A floating/diving multi-action fishing lure having an at-rest water surface position and comprising:
a buoyant head section extending along an axis and having a rear end and a front end portion spaced forwardly from said rear end along said axis, said front end portion having a concavely dished front end surface;
a buoyant tail section having front and rear ends spaced apart along an axis, the axial length of said tail section being substantially greater than that of said head section;
connecting means for jointedly connecting said rear end of said head section to said front end of said tail section in a spaced relationship therewith;
hook means operatively secured to one of said head and tail sections for hooking a fish striking said lure;
line attachment means secured to said front end of said head section in a generally laterally aligned and downwardly offset relationship with said head section axis and operatively connectable to the lure end of a fishing line;
weight means, carried by a lower rear end portion of said head section, for downwardly and rearwardly tilting said head section when said lure is in its at-rest water surface position; and
elongated lip means transversely secured to a front underside portion of said head section and longitudinally projecting outwardly from opposite sides thereof, said lip means being selectively operative to:
cooperate with said concavely dished front end surface of said head section to create a surface water pop forwardly thereof in response to a forward line tug exerted on said line attachment means with said lure in its at-rest water surface position, and diminish the forward surface travel of said lure created by the forward line tug, or cause said lure to twitch side-to-side on the water surface in response to a series of generally forward, sequentially oppositely horizontally angled line tugs exerted on said line attachment means with said lure in its at-rest water surface position, and diminish the forward surface travel of said lure created by the oppositely angled line tugs, or cause said lure to dive beneath the surface of the water and travel in a forward, side-to-side wiggling motion in response to a continuing line retrieval force exerted on said line attachment means and initiated when said lure is in its atrest water surface position, or cause said lure to roll over from its at-rest water surface position onto its upper side, to an inverted lure position, and move forwardly along the water surface, creating a water plume passing rearwardly over the inverted lip means, in response to a relatively hard, horizontally angled line pull on said line attachment means an ensuing continuous line retrieval force thereon, said weight means being further operative, in response to termination of line force on said line attachment means, to roll said lure over from said inverted lure position to said at-rest water surface position of said lure.

8. A floating/diving multi-action fishing lure having an at-rest water surface position and comprising:
   a buoyant head section extending along an axis and having a rear end and a concavely dished front end spaced forwardly from said rear end along said axis;
   a buoyant tail section having front and rear ends spaced apart along an axis, the axial length of said tail section being substantially greater than that of said head section;
   connecting means for jointedly connecting said rear end of said head section to said front end of said tail section in a spaced relationship therewith;
   hook means operatively secured to one of said head and tail section for hooking a fish striking said lure;
   line attachment means secured to said front end of said head section in a generally laterally aligned and downwardly offset relationship with said head section axis and operatively connectable to the lure end of a fishing line;
   weight means, carried by a lower rear end portion of said head section, for downwardly and rearwardly tilting said head section when said lure is in its at-rest water surface position and said weight means being internally carried within said lower end portion of said head section; and
   lip means secured to a front underside portion of said head section and being selectively operative to:
   cooperate with said concavely dished front end of said head section to create a surface water pop forwardly thereof in response to a forward line tug exerted on said line attachment means with said lure in its at-rest water surface position, and diminish the forward surface travel of said lure created by the forward line tug, or
   cause said lure to twitch side-to-side on the water surface in response to a series of generally forward, sequentially oppositely horizontally angled line tugs exerted on said line attachment means with said lure in its at-rest water surface position, and diminish the forward surface travel of said lure created by the oppositely angled line tugs, or
   cause said lure to dive beneath the surface of the water and travel in a forward, side-to-side wiggling motion in response to a continuing line retrieval force exerted on said line attachment means and initiated when said lure is in its atrest water surface position, or
   cause said lure to roll over from its at-rest water surface position onto its upper side, to an inverted lure position, and move forwardly along the water surface, creating a water plume passing rearwardly over the inverted lip means, in response to a relatively hard, horizontally angled line pull on said line attachment means an an ensuing continuous line retrieval force thereon, said weight means being further operative, in response to termination of line force on said line attachment means, to roll said lure over from said inverted lure position to said at-rest water surface position of said lure.

9. The multi-action fishing lure of claim 7 wherein:
said lip means laterally protrude forwardly and downwardly beyond said front end portion of said head section.

10. The multi-action fishing lure of claim 9 wherein:
said lip means are essentially planar.

11. The multi-action fishing lure of claim 10 wherein:
the plane of said lip means extends at a downwardly and forwardly inclined angle relative to said head section axis.

12. The multi-action fishing lure of claim 11 wherein:
said angle is within the approximate range of from about 37° to about 60°.

13. The multi-action fishing lure of claim 12 wherein:
said angle is approximately 45°.

14. The multi-action fishing lure of claim 7 wherein:
said head section has an upwardly and rearwardly sloped slot formed in a bottom side portion thereof adjacent its front end, and
said lip means comprise an elongated, essentially planar lip member having a laterally narrowed longitudinally central portion received and anchored within said slot, and a pair of end portions projecting generally horizontally outwardly therefrom on opposite sides of said head section, said end portions having front side edges positioned downwardly and forwardly of said front end of said head section.

15. The multi-action fishing lure of claim 14 wherein:
said lip member extends lengthwise along a generally central longitudinal axis thereof, and
said line attachment means comprise a line attachment eye member generally laterally aligned with said longitudinal axis of said lip member.

16. The multi-action fishing lure of claim 14 wherein:
said front side edges of said end portions of said lip member are convexly curved and extend outwardly from a central water relief indentation formed in a front side edge portion of said lip member.

17. The multi-action fishing lure of claim 16 wherein:
said end portions of said lip member have curved outer ends and substantially straight rear side edge portions.

18. The multi-action fishing lure of claim 7 wherein:
said lip means are spaced downwardly from said axis of said head section.

* * * * *